United States Patent [19]
Cvijetic et al.

[11] Patent Number: 5,917,635
[45] Date of Patent: Jun. 29, 1999

[54] OPTICAL REPEATERS FOR SINGLE-AND MULTI-WAVELENGTH OPERATION WITH DISPERSION EQUALIZATION

[75] Inventors: Milorad Cvijetic, Nepean; Douglas S. Burbidge, Kanata, both of Canada

[73] Assignee: Northern Telecom Limited, Montreal, Canada

[21] Appl. No.: 08/655,399

[22] Filed: May 30, 1996

[51] Int. Cl.[6] .................................................. H04B 10/17
[52] U.S. Cl. ..................... 359/179; 359/130; 359/339; 359/348; 359/349; 385/37
[58] Field of Search ................................... 359/179, 339, 359/347, 348, 349, 130; 385/37

[56] References Cited

U.S. PATENT DOCUMENTS 4,953,939  9/1990  Epworth ............................. 350/96.19

*Primary Examiner*—Leslie Pascal
*Attorney, Agent, or Firm*—Angela C. de Wilton

[57] ABSTRACT

An optical repeater is described which integrates an erbium doped optical fiber amplifier (EDFA) with a dispersion equalizer (DE) based on fiber gratings. The dispersion equalizer is based on parallel connection of two fiber gratings for single carrier wavelength operation, and on parallel connection of a cascade of two fibre grating branches, each carrying a plurality grating elements chirped for different wavelengths, for WDM operation at a plurality of wavelengths.

The use of two gratings sections for each wavelength improves the optical bandwidth of the equalizer compared with single grating designs, doubling the effective bandwidth. Further, the grating DE is disposed between two fiber amplifier sections which share a single pump laser. Thus, this arrangement provides dispersion compensation and loss compensation in an optical repeater of lower cost, and smaller size, compared to a system of similar performance configured using discrete components.

12 Claims, 1 Drawing Sheet

OPTICAL REPEATERS FOR SINGLE-AND MULTI-WAVELENGTH OPERATION WITH DISPERSION EQUALIZATION

FIELD OF INVENTION

This invention relates to optical repeaters for single- and multi-wavelength operation, with particular application to wavelength division multiplex (WDM) optical telecommunication systems operating at bit rates in the range from 2.5 Gb/s to 10 Gb/s per carrier wavelength.

BACKGROUND OF THE INVENTION

Existing optical fibre networks are based primarily on non-dispersion shifted fiber (NDSF). For wavelength division multiplex (WDM) optical communications systems, chromatic dispersion induced during optical signal propagation through NDSF fibers is a major constraint which limits the length-bandwidth product in an optical communication system operating in the 1550 nm wavelength region.

Dispersion compensation in the 1550 nm wavelength region is an attractive way to overcome this constraint. Various schemes are known to have been suggested or employed for dispersion compensation.

The conventional approach, employing a length of dispersion compensating fiber (DCF) is widely used. Other compensators are known based on fibre gratings, optical interferometers, or cascades of birefringent optical fibers.

To overcome losses in a preceding optical fiber span and in a dispersion compensating element, a dispersion compensating element is used in combination with one or two erbium doped fiber amplifiers, each requiring a pump laser. The latter combination is conventionally used either in discrete or integrated form, with a dispersion compensating fiber. The result is expensive and large sized repeater equipment.

Use of an optical fiber grating as a dispersion equalizer instead of dispersion compensating fibre has the potential for lower cost, but the drawback of known dispersion equalizers based on grating systems is the narrow optical bandwidth and resultant high sensitivity for carrier frequency fluctuations. For example, an optical fibre transmission system using a chirped Bragg reflector and directional coupler for dispersion equalization is described in U.S. Pat. No. 4,953,939 entitled "Optical Fibre Transmission Systems" to Epworth. Epworth uses a piece of fibre in which reflective properties of the grating are graded along the length of the piece of fibre. Different sections of the piece of fibre reflect different optical frequencies and this system provides limited bandwidth. Also, in practice, each optical fiber grating based dispersion equalizer requires an optical amplifier for loss compensation.

The optical bandwidth of a chirped fiber grating is directly proportional to the length of the grating. Given a practical length limitation based upon grating stability and/or manufacturability, the desired optical bandwidth determines the grating chirp parameter, which in turn determines the amount of dispersion compensation from the fiber grating. In known systems, increased dispersion compensation can be achieved only at the expense of optical bandwidth for a given grating length.

SUMMARY OF THE INVENTION

The present invention seeks to provide an optical repeater for single- and multi-wavelength operation with dispersion equalization, which overcomes or avoids the above-mentioned problems.

According to one aspect of the present invention, there is provided an optical repeater comprising a dispersion equalizer provided by first and second cascaded lengths of optical fiber grating coupled in parallel connection in first and second output ports of an optical coupler, the cascaded gratings being coupled between first and second lengths of a fibre amplifier.

Thus, dispersion equalization is provided by two lengths of fiber grating that are cascaded so that the bandwidth is doubled relative to the same amount of dispersion compensation using a single grating approach. The insertion loss of the equalizer element is efficiently compensated by inserting it between two sections of a fiber amplifier which share a common pump laser. The optical repeater provides optical loss compensation and chromatic dispersion compensation, and the bandwidth is doubled relative to conventional systems using a grating for dispersion equalization.

Preferably, the fiber amplifier comprises first and second lengths of an erbium doped fiber, and both lengths of fiber are pumped by a single laser source. The system uses a single pumped optical amplifier, in place of discrete optical amplifiers associated with each grating. Because only one pump laser source is required, the cost is reduced.

Advantageously, an optical repeater is provided for multi-wavelength operation for a WDM system operating with a plurality of wavelengths, wherein each length of optical fiber grating comprises a plurality of grating elements coupled in series each designed to reflect one of the plurality of operating wavelengths. Each grating comprises a cascade of grating elements chirped for each of the wavelengths. Thus an optical repeater for WDM operation is provided by connecting appropriately tuned fiber gratings in series.

For example, an optical repeater for cascaded dispersion compensation for 4 carrier wavelengths includes first and second cascaded optical fibre grating stages, each grating stage comprising four optical fiber grating elements in series. Each grating element is chirped for a specific one of the carrier wavelengths so that each grating element of the cascade is designed to reflect one of the four carrier wavelengths and transmit other wavelengths.

Thus, an optical repeater providing dispersion equalization and loss compensation is provided, based on cascaded fiber gratings, which offers improved optical bandwidth, a reduction in size, and reduced cost compared to known systems.

BRIEF DESCRIPTION THE DRAWINGS

Embodiments of the invention will now be described by way of example, with reference to the accompanying drawings, in which.

DESCRIPTION OF THE PREFERRED EMBODIMENTS

Figure 1:
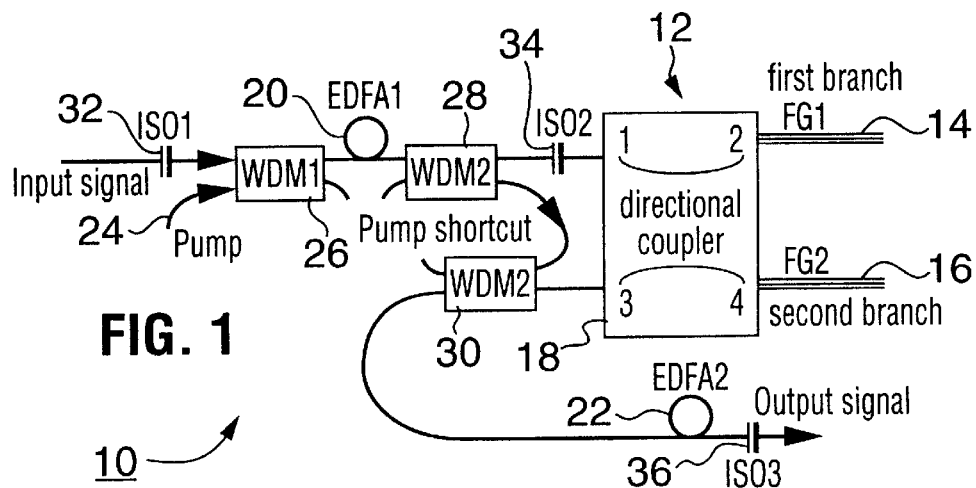
FIG. 1 shows an optical repeater according to a first embodiment of the present invention for single wavelength operation.

An optical repeater 10 according to a first embodiment of the present invention is shown schematically in FIG. 1 and comprises a single wavelength dispersion equalizer 12, which comprises a cascade of two optical fiber gratings 14 (FG1) and 16 (FG2) connected in parallel through an optical coupler, that is, coupled to two ports of a four port directional coupler 18.

The dispersion equalizer 12 is coupled between sections of a conventional erbium doped fiber amplifier (EDFA), which is divided into first and second sections 20 (EDFA1) and 22 (EDFA2), comprising an optical fiber heavily doped with erbium ions to a concentration of typically 1500 to 2500 ppm. For example, the first section 20 is 10 to 12 meters long and the second section 22 is 10 to 11 meters long. That is, a standard length of 20 to 25 meters of fibre is divided into two sections: the second part may be somewhat longer than the first part, i.e. by 1 to 2 meters, because it is pumped by a more attenuated pump signal.

The two lengths 20 and 22 of erbium doped fiber are pumped by a single pump laser 24 using three wavelength selective couplers 26, 28, and 30 (WDM1, WDM2 and WDM3) as shown in FIG. 1, to direct about 50% of the pump power into the first fiber section 20 (EDFA1), and about 50% into the section fiber section 22 (EDFA2).

Thus, an incoming optical signal from a preceding optical fiber span passes through a first optical isolator 32 (ISO1) through the first wavelength selective coupler 26 (WDM1) and into the first length of erbium doped fiber 20 (EDFA1). The signal passes through a second wavelength selective coupler 28 (WDM2) and enters the directional optical coupler 12 through a second optical isolator 34 (ISO2) at port 1, is reflected at each of the dispersion gratings 14 and 16 at corresponding output ports 2 and 4, exits the coupler 12 from port 3, and enters the second length of erbium doped fiber 22 through another wavelength selective coupler 30 (WDM3), exiting through the repeater through another optical isolator 36 (ISO3).

Figure 3:
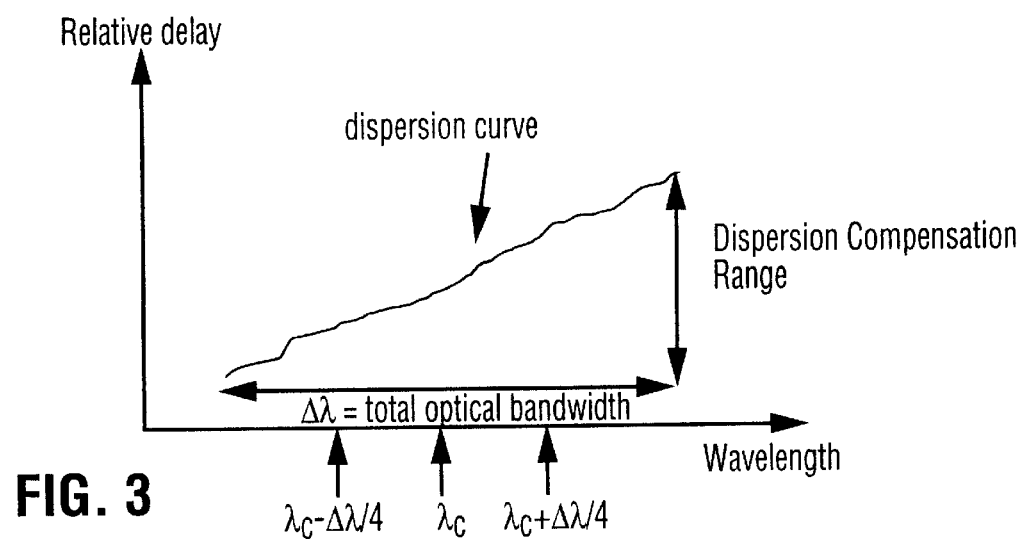
FIG. 3 shows an optical bandwidth and dispersion curve for a two branch fiber grating equalizer of the first embodiment.

Each grating 14 and 16 is an in-fibre Bragg grating with linear chirp resulting in a linearly decreasing pitch imprinted along a piece of fibre. Grating 14 is imprinted along the entire length of the corresponding piece of fiber. Thus the effective length of the fibre, 3 cm to 3.3 cm, is the length of the in-fiber Bragg grating. The second fiber piece has a total length of 6 cm to 6.6 cm and grating 16 is imprinted only along the second half of this piece, so that the length of the fibre Bragg grating 16 is also 3 cm to 3.3 cm long. The signal carrier wavelength $\lambda_s$ in the single wavelength scheme of FIG. 1 corresponds to the central wavelength of the two branch equalizer $\lambda_c$, as shown in FIG. 3. The fibre grating 14 (FG1) is chirped to provide that the average product of its effective refractive index to the grating mechanical period corresponding to a wavelength $(\lambda_c-\Delta\lambda/2)/2$ where $\Delta\lambda$ represents the bandwidth of the two branch fiber grating equalizer. At the same time, fiber grating 16 (FG2) is chirped to provide an average product of its effective refractive index to the grating mechanical period corresponding to a wavelength of $(\lambda_c+\Delta\lambda/2)/2$. Therefore, in the optical repeater according to a first embodiment of the present invention, two lengths of fiber grating are cascaded so that the bandwidth is doubled i.e. the combined bandwidth of both grating stages $\Delta\lambda$ (see FIG. 3) for the same amount of dispersion compensation, relative to a single grating approach.

Both gratings 14 and 16 operate in reflection mode for the incoming optical signal, with means that shorter wavelengths within the signal spectral width travel further into the grating than longer wavelengths, if gratings operate in the 1530 to 1560 nm region. As a result, the group delay between longer wavelengths and shorter wavelengths within the spectral width of the signal is compensated.

The two band dispersion equalizer shown schematically in FIG. 1 can tolerate carrier wavelength fluctuations of $\Delta\lambda-\Delta\lambda_s$ where $\Delta\lambda$ represents the optical bandwidth of the dispersion equalizer element 12, while $\Delta\lambda_s$ represents the optical spectral width of the data signal. If the signal carrier wavelength becomes lower than the central wavelength of the two branch equalizer, fibre grating 14 (FG1) will take over the dispersion compensation function and if the signal carrier wavelength becomes higher than the central wavelength of the equalizer, fibre grating 16 (FG2) will take over the dispersion compensation function. The optical isolators 32, 34 and 36 (ISO1, ISO2 and ISO3) are included to prevent backward reflected signals from influencing the operation of the preceding elements. Each isolator preferably has insertion losses lower than 0.5 dB and backward attenuation higher than 30 dB. Conventional wavelength division multiplex couplers 26, 28 and 30 (WDM1, WDM2, WDM3) are used for pump injection into the optical fiber lengths 20 and 22. A 3 dB directional coupler 12 is used for the two branch fibre grating.

The total losses inserted by the directional coupler and fibre grating elements, measured between ports 1 and 3 of the directional coupler, were 7 dB to 9 dB. The pump signal by-passes the directional coupler 12 through which the signal passes, and the pump signal is diverted directly from the coupler 28 (WDM2) through to coupler 30 (WDM3). Optical losses inserted by WDM couplers 26, 28 and 30 were 0.9 dB to 1.2 dB each.

The optical repeater is capable of compensating both the losses and chromatic dispersion from a preceding optical fiber span with a maximum length of about 80 to 105 km, and a total chromatic dispersion of 1700 to 1800 ps/nm.

The total optical power of the pump was in the range 13 to 16 dBm at a central wavelength of 980 nm. The total gain in the first and second lengths of the erbium doped fiber are in the range 27 to 33 dB. The input signal was no lower than −15 dBm at the carrier wavelength.

Thus the insertion loss of the dispersion equalizer element is efficiently compensated by inserting it between two sections of fibre amplifier, which preferably share a common pump laser.

This scheme may be expanded for WDM operation, i.e. using multiple wavelengths, by connecting in series a plurality of appropriately tuned fiber gratings in each grating stage.

Figure 2:
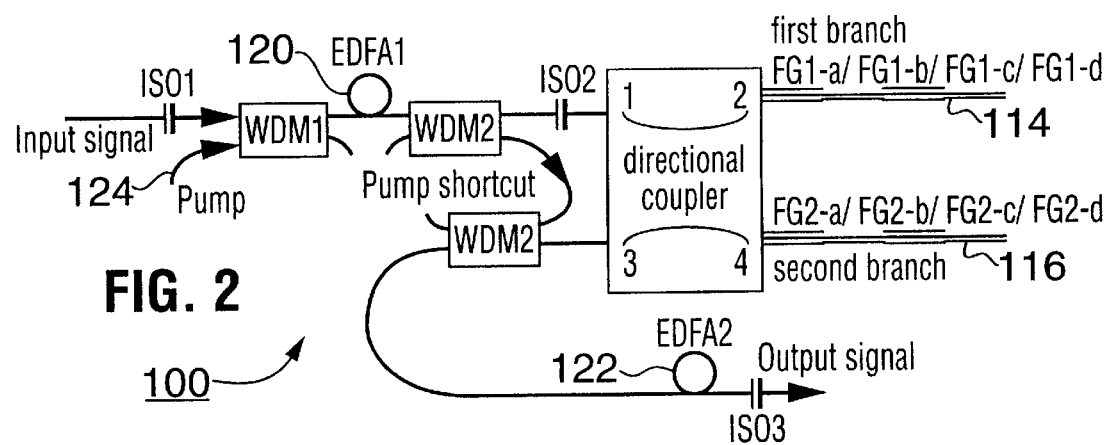
FIG. 2 shows an optical repeater according to a second embodiment of the present invention for multiple wavelength operation in WDM mode.

Thus, in an optical repeater 100 according to a second embodiment of the present invention for four wavelength operation is shown in FIG. 2. This optical repeater 100 is similar to that shown in FIG. 1, and like elements are referred to by the same reference numeral incremented by 100, for example dispersion equalizer 112 and first and second lengths of erbium doped fiber amplifier 120 and 122 pumped by a single common laser source 124. Wavelength selective couplers and optical isolators are provided similarly to those of the first embodiment. The optical repeater of the second embodiment differs from that of the first embodiment in that, instead of cascaded single gratings 14 and 16 in each branch as shown in FIG. 1, each grating branch 114 and 116 comprises a series of four fiber gratings, so that there is effectively a cascade of four grating pairs, each grating pair being designed for a specific carrier wavelength. The operational principle for a four wavelength optical repeater is the same and for single wavelength repeater of the first embodiment, but there is wavelength selection within each fiber grating stage. Each fiber grating from each stage operates in the reflection regime for the corresponding carrier wavelength, while operating in the transmission regime for the other carrier wavelengths.

For example, in FIG. 2, gratings designated FG1a and FG2a are designed for a carrier wavelength $\lambda_a$, and gratings designated FG1b and FG2b are designed for wavelength $\lambda_b$, gratings designated FG1c and FG2c are designed for wavelength $\lambda_c$, gratings designated FG1d and FG2d are designed for wavelength $\lambda_d$. Thus gratings FG1a, FG1b, FG1c and FG1d are chirped using the aforementioned methodology to match operating carrier wavelengths $(\lambda_a-\Delta\lambda/2)/2$ $(\lambda_b-\Delta\lambda/2)/2$, $(\lambda_c-\Delta\lambda/2)/2$, $(\lambda_d-\Delta\lambda/2)/2$ respectively. Fiber gratings FG2a, FG2b, FG2c and FG2d are chirped to match operating carrier wavelengths $(\lambda_a+\Delta\lambda/2)/2$, $(\lambda_b+\Delta\lambda/2)/2$ $(\lambda_c+\Delta\lambda/2)/2$, $(\lambda_d+\Delta\lambda/2)/2$ respectively.

Practically, carrier wavelengths should be no less than 3 nm apart from each other. The optical equalizer operates independently for each carrier wavelength and there is negligible mutual interaction between particular carrier wavelength and gratings that do not belong to the group that support this wavelength. The total gain of the system shown in FIG. 2 is 32 dBm.

While the system could be extended for multiple wavelength operation with more than four wavelengths, i.e. $\lambda_a$, $\lambda_b$, $\lambda_c$, . . . $\lambda_n$, in practice, a compact version would accommodate only a limited length of dispersion grating fibers before stability of operation is diminished.

In each of the above described embodiments, fiber dispersion gratings are provided with a linear chirp with an average pitch equal to the desired Bragg resonant centre wavelength, divided by twice the effective refractive index of the signal carrier optical waveguide. The chirp constant of the grating is in the range 0.23 nm, to 0.25 nm. The length of each of the gratings, except FG2 and FG2-a, is 3.0 cm to 3.3 cm, with the optical bandwidth of 0.25 nm to 0.27 nm. The lengths of sections forming FG2 and FG2-a are 6.0 cm to 6.6 cm where the first half of this length is regular fiber, without a grating, and the second half of this length represents the grating imprinted in the fiber. The total optical bandwidth of the two branch fiber grating couple is 0.42 nm to 0.47 nm.

Thus the optical repeaters described above and shown schematically in FIGS. 1 and 2, compensate both losses and chromatic dispersion from a preceding optical fiber span, having e.g. a length of 80 km to 105 km, and a total chromatic dispersion of 1700 to 1800 ps/nm.

The total optical power of the pump is in the range from 13–16 dBm at a central wavelength of 980 nm. The total gain in EDFA1 and EDFA2 is in the range from 27 dB to 33 dB. The input signal level is no lower than −15 dBm at the carrier wavelength.

Thus an optical repeater is provided for single and multiwavelength operation comprising dispersion equalization provided by at least two cascaded lengths of optical fiber grating coupled in parallel connection in first and second ports of an optical coupler, input and output ports of the coupler coupled to first and second lengths of a fibre amplifier and a common pump source, which spreads the narrow optical bandwidth of a dispersion compensator based on optical fiber gratings, and compensates for optical losses induced by the dispersion compensator in a compact and efficient arrangement using a EDFA with single pump source.

It will be appreciated that, while specific embodiments of the invention are described in detail above, numerous variations and modifications of these embodiments fall within the scope of the invention as defined in the following claims.

What is claimed is:

1. An optical repeater comprising:

a dispersion equalizer comprising an optical coupler, having an input port, an output port, and cascaded first and second optical fiber grating branches coupled in parallel through the optical coupler, and first and second sectionsof optical fiber amplifiers coupled to the input port and output port respectively of the optical coupler, and means for coupling an input optical signal into the first section of the optical fiber amplifier and means for coupling an output optical signal from the second section of the optical fiber amplifier, one of the first and second grating branches comprising a grating element chirped to provide selective reflection in an optical bandwidth above a selected operating wavelength $\lambda_c$, and the other of the first and second grating branches comprising a grating element chirped to provide selective reflection in an optical bandwidth below a selected operating wavelength $\lambda_c$, the total optical bandwidth $\Delta\lambda$ of the equalizer being the combined optical bandwidths of the two grating elements.

2. An optical repeater according to claim 1 wherein the first and second lengths of the fiber amplifier are coupled to a single laser pump source.

3. An optical repeater according to claim 1 for multiwavelength operation for a WDM system operating with a plurality of wavelengths, wherein each length of optical fiber grating comprises a plurality of grating elements coupled in series, each grating element designed to reflect one of the plurality of operating wavelengths.

4. An optical repeater according to claim 1 wherein cascaded dispersion compensation for four carrier wavelengths is provided by cascaded first and second optical fiber grating stages, each grating stage comprising four optical fiber grating elements in series, each grating element being designed to reflect one of the four carrier wavelengths and transmit other wavelengths.

5. An optical repeater according to claim 1 wherein each grating is an in-fiber Bragg grating with linear chirp.

6. An optical repeater according to claim 1 where the first grating is chirped to provide an average product of its effective refractive index and the grating mechanical period corresponding to a wavelength $(\lambda_c-\Delta\lambda/2)/2$ where $\Delta\lambda$ represents the bandwidth of the two branch fiber grating equalizer, and the second optical fiber grating chirped to provide an average product of its effective refractive index and the grating mechanical period corresponding to a wavelength of $(\lambda_c+\Delta\lambda/2)/2$, where the central wavelength of the two branch equalizer is $\lambda_c$.

7. An optical repeater according to claim 1 wherein the fiber amplifier comprises first and second lengths of erbium doped fiber.

8. An optical repeater according to claim 1 wherein the optical coupler comprises a four port coupler comprising the input and output ports and two other ports, and first and second optical fiber grating branches are coupled to the other ports of the optical coupler.

9. An optical repeater according to claim 1 for single wavelength operation, wherein each optical fiber grating branch comprises a single grating to form a cascaded matched pair of gratings.

10. An optical repeater according to claim 1 for multi wavelength operation at a series of wavelengths $\lambda_a$, $\lambda_b$, $\lambda_c$, . . . $\lambda_n$, wherein each optical fiber grating branch comprises a series of n grating elements designed to reflect one of the series of wavelengths $\lambda_a$, $\lambda_b$, $\lambda_c$, . . . $\lambda_n$ respectively, to form a cascade of n wavelength selective grating pairs.

11. An optical repeater according to claim 10 for four wavelength operation wherein each optical fiber grating branch comprises a series of four grating elements to form a cascade of four grating pairs.

12. An optical repeater comprising a dispersion equalizer comprising an optical coupler having an input port, an output port and cascaded first and second optical fiber grating elements coupled in parallel through other ports of the optical coupler;

first and second sections of an optical fiber amplifier coupled to the input port and output port respectively of the optical coupler;

means for coupling an input optical signal into the first section of optical amplifier and means for coupling an output optical signal from the second section of optical fiber amplifier, and the first optical fiber grating element chirped to provide an average product of its effective refractive index and the grating mechanical period corresponding to a wavelength $(\lambda_c - \Delta\lambda/2)/2$, and the second optical fiber grating element chirped to provide an average product of its effective refractive index and the grating mechanical period corresponding to a wavelength of $(\lambda_c + \Delta\lambda/2)/2$, where $\lambda_c$ is the central wavelength of the two branch equalizer, and $\lambda\Delta$ represents the bandwidth of the two branch fiber grating equalizer being the combined bandwidth of the first and second grating elements.

* * * * *